United States Patent

Hoolhorst

[11] Patent Number: 6,021,945
[45] Date of Patent: Feb. 8, 2000

[54] CARD READING DEVICE

[75] Inventor: Albert Hoolhorst, Aardenburg, Netherlands

[73] Assignee: Siemens Aktiengesellschaft, Munich, Germany

[21] Appl. No.: 08/935,145

[22] Filed: Sep. 22, 1997

[30] Foreign Application Priority Data

Sep. 20, 1996 [DE] Germany .......................... 196 38 646

[51] Int. Cl.⁷ .................................................. G06K 7/06
[52] U.S. Cl. ........................ 235/441; 235/439; 235/475
[58] Field of Search .................................. 235/441, 449, 235/487, 475, 479, 444, 448

[56] References Cited

U.S. PATENT DOCUMENTS 4,810,863  3/1989  Kachi et al. ............................ 235/441
4,904,852  2/1990  Mita et al. .
4,931,622  6/1990  Ohtsuki et al. .
4,976,630  12/1990 Schuder et al. .
5,091,618  2/1992  Takahashi ................................ 235/441
5,202,551  4/1993  Parrer et al. ........................ 235/441 X

*Primary Examiner*—Karl D. Frech
*Attorney, Agent, or Firm*—Herbert L. Lerner; Laurence A. Greenberg

[57] ABSTRACT

The card reading device has contact elements for establishing contact with contact regions on a card, in particular a card which contains a chip. The card reading device is distinguished by a contact element position-changing element which, during the introduction of the card to be read into its reading position and/or during the removal of the card from its reading position, causes the contact elements to move out of their contact position suitable for establishing contact with the card into their non-contact position. The latter position is remote from the contact position and is unsuitable for establishing contact with the card.

10 Claims, 3 Drawing Sheets

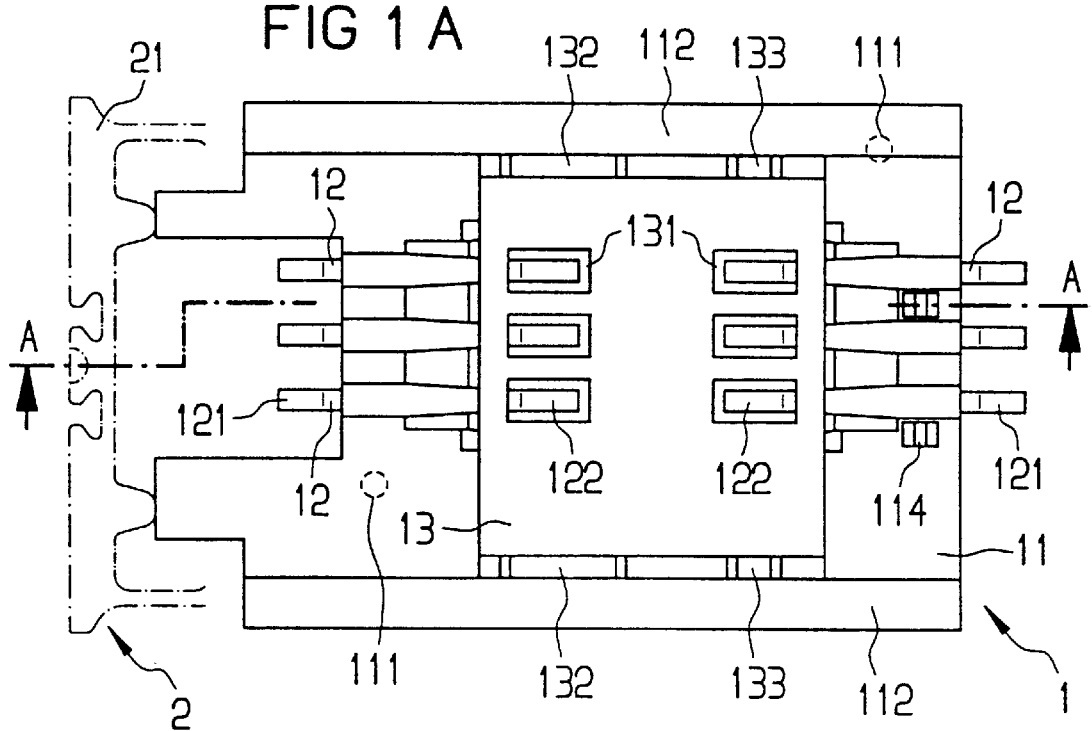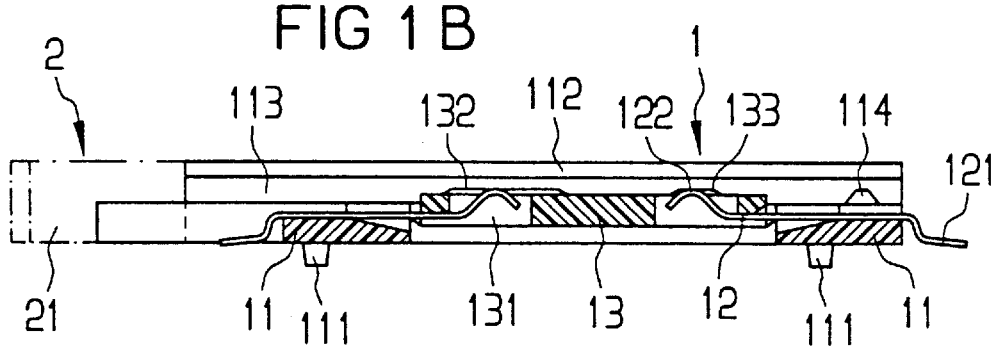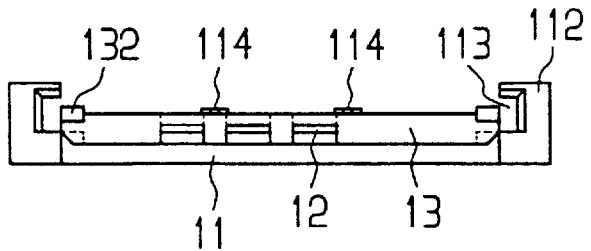

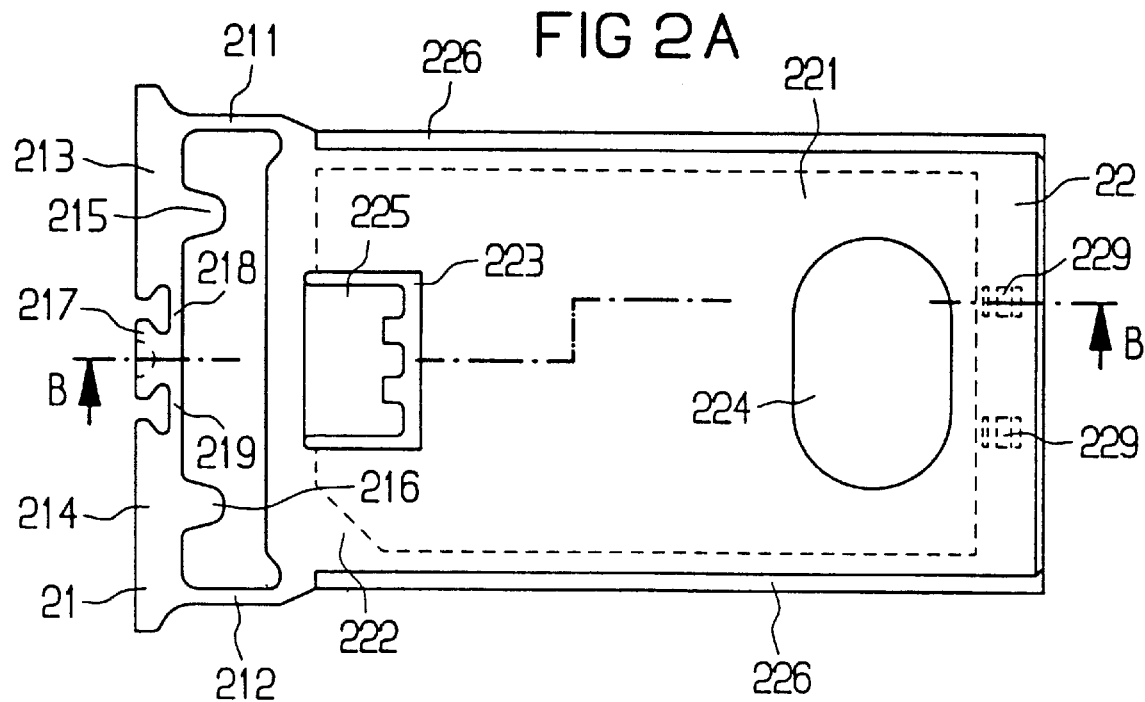
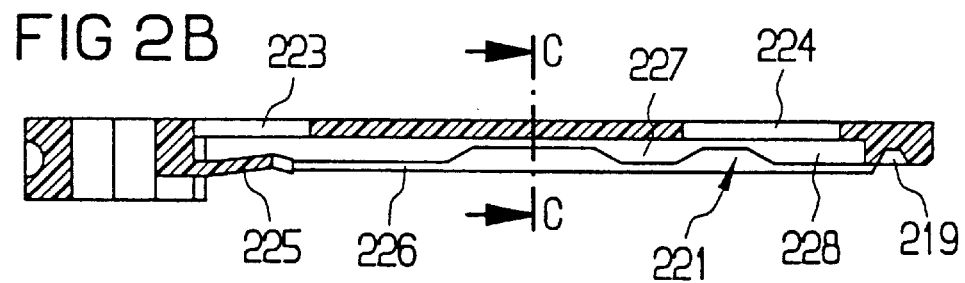
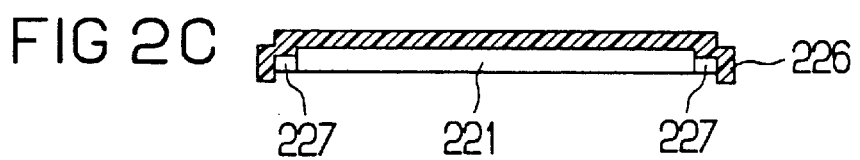

CARD READING DEVICE

BACKGROUND OF THE INVENTION

FIELD OF THE INVENTION

The invention pertains to a card reading device with contact elements enabled to establish contact with contact regions, in particular provided on a card containing a chip.

Such card reading devices are, for example, the reading devices used in mobile telephones for accepting and/or passing on information provided by or for a so-called SIM card or a so-called SIM module.

SIM modules are used in mobile phones, in particular for subscriber identification; SIM is an acronym which stands for "Subscriber Identity Module". SIM modules are very well suited for use in mobile phones, in particular on account of their small dimensions (25×15 mm).

Card reading devices of the type presented herein may, however, also be card reading devices for reading "normal" chip cards.

The SIM modules, "normal" chip cards etc. which can be used in card reading devices are all cards containing chips, or chip cards, and, for the sake of simplicity, are henceforth referred to for short as cards; the operation of accepting and/or passing on information provided by or for a card is henceforth referred to, for the sake of simplicity, as reading the card.

Irrespective of the type of cards to be read by the respective card reading devices, the prior art card reading devices with increasing use sometimes exhibit a drop in reliability when reading the card(s). This applies in particular, but not exclusively, to those card reading devices in which the card has to be introduced into a compartment for reading.

SUMMARY OF THE INVENTION

It is accordingly an object of the invention to provide a card reading device, which overcomes the above-mentioned disadvantages of the prior art devices and methods of this general type and which enables reliable reading of the respective card(s) without errors on a permanent basis, i.e. to the greatest extent irrespective of how long it has been in use.

With the foregoing and other objects in view there is provided, in accordance with the invention, a card reading device for contacting and reading a card with contact regions formed thereon, in particular a card carrying a chip. The device comprises:

contact elements for establishing contact with contact regions formed on the card to be read in the card reading device, the contact elements being movable into a contact position in which the contact elements establish contact with the contact regions on the card, and into a non-contact position remote from the contact position which is unsuitable for establishing contact with the contact regions on the card;

a contact element position-changing element engaging the contact elements for selectively causing the contact elements to move into the contact position during the insertion of the card into the card reading device and into the non-contact position during the removing of the card from the card reading device.

In other words, a contact element position-changing element is provided, which is arranged and configured in such a way that, during the introduction of the card into its reading position and/or during the removal thereof from its reading position, the contact elements can be moved out of the contact position (suitable for establishing contact with and reading the card) into a non-contact position remote from the contact position. The non-contact position is unsuitable for establishing contact with the card.

The resultant effect is that the contact elements of the card reading device (can) come into contact with the card to be read when and only when the latter is already in its intended reading position. This rules out any rubbing of the contact elements on the surface of the card or on other objects during the introduction of the card into its reading position and/or during the removal of the card from its reading position. This in turn recognizably has the positive effect that damage to and/or wearing of the contact elements by frequent and/or awkward introduction of the card into its reading position is ruled out. The risk of damage to and/or wearing of the contact elements is thus reduced to a minimum.

In accordance with an added feature of the invention, the contact element position-changing element is a movable plate covering portions of the contact elements. Preferably, the contact elements include the portions covered by the movable plate and other portions for contacting the contact regions on the card to be read, and wherein the plate has openings formed therein through which the other portions of the contact elements protrude.

In accordance with an additional feature of the invention, the plate is formed with elevations, the elevations being disposed so as to effect a shifting force on the plate when the card is being introduced into or removed from the card reading device, causing the plate to change its position. The elevations may protrude into the path along which the card is moved on the insertion thereof into and the removal thereof from the card reading device.

In accordance with another feature of the invention, the elevations on the plate are arranged such that elevations formed on the card to be read run up onto the elevations on the plate upon an insertion thereof into the card reading device, pushing the elevations on the card away while sliding over the elevations on the plate and maintaining the plate pushed away from the card. Additionally, or alternatively, there is provided a card carrier part for receiving the card to be read, the carrier part being formed with carrier part elevations which run up onto the elevations on the plate upon an insertion thereof into the card reading device, thereby pushing the carrier part elevations away while sliding over the elevations on the plate and maintaining the plate pushed away from the card carrier part.

In accordance with a further feature of the invention, the elevations are arranged in two mutually opposite rows of elevations, each of the rows comprising a plurality of elevations one behind the other and being of respectively different lengths. Furthermore, the plate may be formed with free spaces of different lengths adjacent the elevations, the free spaces receiving the elevations formed on the card to be read and/or on the card carrier part.

In accordance with a concomitant feature of the invention, the plate and the contact elements are disposed such that the contact elements are taken along by the plate when the plate is being shifted.

The resultant, essentially consistently maintained good condition of the contact elements has a positive effect on the reliability during reading of the respective card(s). The reliability is constantly high.

The invention thus provides for a novel card reading device by which the reading of the respective card(s) can be reliably carried out without errors on a permanent and repeated basis, i.e. to the greatest extent irrespective of how long it has been in use.

The moving away of the contact elements from the surface of the card during the introduction and/or removal of the card into and from its reading position has, furthermore, the positive effect that the contact elements cannot be short-circuited during these operations by the contact regions (surface contacts) of the card running over them, as a result of which it is possible to dispense with separate measures to avoid this.

Other features which are considered as characteristic for the invention are set forth in the appended claims.

Although the invention is illustrated and described herein as embodied in a card reading device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1A is a plan view of a contact carrier part of a card reading device according to the invention;

FIG. 1B is a sectional view of the contact carrier part of FIG. 1A taken along the line A—A;

FIG. 1C is a side elevational view of the contact carrier part of FIGS. 1A and 1B;

FIG. 2A is a plan view of a card carrier part of the card reading device according to the invention;

FIG. 2B is a sectional view of the card carrier part of FIG. 2A taken along the line B—B;

FIG. 2C is a sectional view of the card carrier part taken along the line C—C in FIG. 2B);

DESCRIPTION OF THE PREFERRED EMBODIMENTS

Figure 3A:
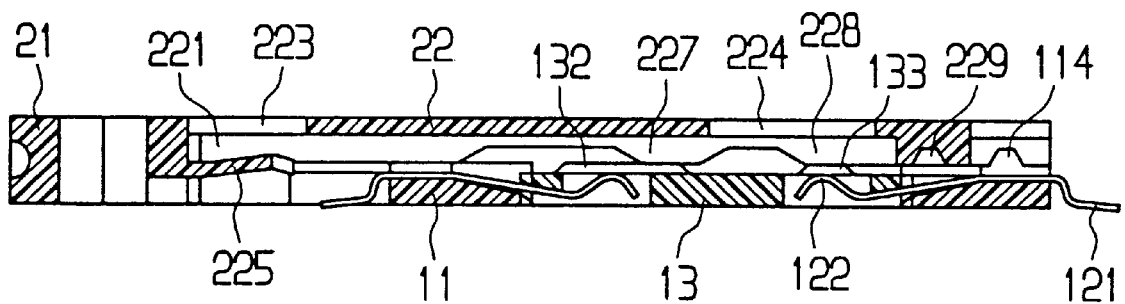
FIG. 3A is a partly sectional view illustrating the situation in which the (cardless) card carrier part of FIG. 2 (FIGS. 2A, 2B, and 2C) is just being pushed into the contact carrier part of FIG. 1 (FIGS. 1A, 1B, and 1C)

The card reading device described below is a card reading device adapted to read SIM modules. This does not mean, however, that the invention is restricted to card reading devices designed for this purpose. It will be understood by those versed in this field that the invention can also be used with card reading devices for reading any other cards (chip cards).

In the exemplary embodiment illustrating the best mode, the card reading device comprises a contact carrier part and a card carrier part; the card to be read by the card reading device is inserted into the card carrier part and is pushed together with the latter into the contact carrier part. However, there is also no restriction to this construction. In principle, the card to be read could also be pushed in directly, i.e. without a card carrier part.

Referring now to the figures of the drawing in detail and first, particularly, to FIGS. 1A, 1B, and 1C thereof, there is seen a contact carrier part denoted by reference numeral 1. The contact carrier part 1 comprises an insulator 11, six contact elements in the form of contact springs 12 and a contact element position-changing element in the form of a plate 13.

In FIGS. 1A and 1B, parts of the card carrier part 2, described in more detail later (see FIG. 2), are also represented by dashed lines in the position in which it has been pushed into the contact carrier part 1.

The contact carrier part 1, i.e., the insulator 11 and the contact springs 12 thereof, are adapted to be mounted on a non-illustrated electrical circuit board. The insulator 11 has for this purpose, as can be seen in particular from FIGS. 1A and 1B, mounting pins 111, which can be inserted into corresponding recesses in the electrical circuit board and, if need be, can also be fastened there. The contact springs 12 are formed at one of their respective ends as soldering lugs 121, which can be soldered to the circuit board, for example using an SMT soldering process.

The insulator 11 is that component of the contact carrier part 1 which holds the latter together, to be more specific its other components, and makes it possible for it to interact in the intended way with the card carrier part 2.

The last-mentioned function of the insulator 11 may be performed by the latter, in particular, by the provision of groove-like clearances 113 in raised marginal portions 112 on mutually opposite sides of the insulator 11. The (mutually facing) groove-like clearances 113 may serve, as can be seen in particular from FIG. 1C, as a guide for the card carrier part 2 which is to be brought into engagement with the contact carrier part 1 (by pushing one over the other or one into the other) and is described in still further detail later. The direction along which the card carrier part 2 must be moved in relation to the contact carrier part 1 in order to be pushed into the latter is the direction running horizontally to the right in FIGS. 1A and 1B and into the plane of the drawing in FIG. 1C.

Each of the contact springs 12 has an elastically deformable (movable) dome-shaped end portion 122. The end portion 122 is in each case that part of the contact springs 12 by which the latter come into contact with the contact regions (surface contacts) of the card(s) to be read.

The contact springs 12 are partially covered by the plate 13. The plate 13 has clearances 131, through which the end portions 122 of the contact springs 12 protrude.

The clearances 131 are positioned in such a way that the end portions 122 of the contact springs meet exactly with the contact regions of the card to be read when the latter is in its reading position within the card reading device. In the example considered—the card to be read is an SIM module—altogether there are provided six contact springs 12, which are arranged in two rows, each comprising three contact springs 12.

The plate 13 h as on each of its sides facing the raised marginal portions 112 of the insulator 11 elevations 132 and 133, which extend essentially parallel to the raised marginal portions 112 at a small distance from them and, as can be seen in particular from FIGS. 1B and 1C, partially cover the groove-like clearances 113 provided in the marginal portions 112.

The elevations 132 and 133 of the plate 13 present an obstruction when the card carrier part 2 is pushed into the groove-like clearances 113 of the contact carrier part 1. The plate 13 can, however, as will be described in still more detail, be pressed out of the way toward the circuit board by the card carrier part 2. This has two effects: on the one hand, the card carrier part 2 can then be pushed essentially unhindered into the contact carrier part 1 and, on the other hand, the pressing away of the plate 13 causes not only the plate itself but also the contact springs 12 (in particular their end portions 122) to be pressed away.

The pressing away of the contact springs 12 is effected by the pressing away of the plate 13; the contact springs 12, to be more specific their end portions 122 in particular, are taken along by the plate 13.

The pressing away of the plate 13 by the card carrier part 2 is effected by elevations of the card carrier part 2, which run over the elevations 132 and 133 of the plate 13, pressing the latter away, when the card carrier part 2 is pushed into the contact carrier part 1. In order that the elevations of the card carrier part 2, which are inherently at the same height as the elevations 132 and 133 of the plate 13, can run over the latter with little resistance, the elevations 132 and 133 have, as can be seen in particular from FIG. 1B, run-up slopes at their front and rear ends.

In the state in which the card carrier part 2 has been pushed fully into the contact carrier part 1, a card (to be read) received in the card carrier part 2 is automatically in its reading position. In this state, the elevations of the card carrier part 2 have crossed over the elevations 132, 133 of the contact carrier part 1 to such an extent that the active pressing away of the plate 13 by the card carrier part 2 is ended. The plate 13 is pressed back in the direction of its original position by the spring force of the contact springs 12, to be precise until the latter, i.e., their dome-like end portions 122, reach the contact regions of the card to be read and thereby establish contact with them.

In order that the card carrier part 2 cannot simply fall out of the contact carrier part 1, the insulator part 11 of the contact carrier part 1 has one or more latching elements in the form of detents 114, which engage with assigned latching elements (latching depressions) of the card carrier part 2 in the state in which the card carrier part 2 has been pushed fully into the contact carrier part 1.

Referring now more specifically to FIGS. 2A, 2B and 2C, the card carrier part 2 is denoted by the reference numeral 2. The card carrier part 2 is of one-piece construction, it has an unlocking portion 21 and a card receiving portion 22.

With particular reference to FIG. 2A, the card receiving portion 22 is formed with a trough-like depression 221, which is represented there by dashed lines. The depression 221 serves as a card supporting area into which the card to be read can be inserted. The trough-like depression 221 is adapted to the shape of the card to be read. In accordance with the SIM modules to be used in the exemplary embodiment, it has a so-called coding slope 222, which prevents the SIM module from being placed into the trough-like depression 221 in the wrong orientation.

The base of the trough-like depression 221, as can be seen in particular from FIGS. 2A and 2B, has openings 223 and 224 formed therein, which make it possible to push a card inserted into the trough-like depression 221 out of the trough-like depression 221 from the remote side of the base and thereby remove the card from the card carrier part 2.

From the edge of the trough-like depression 221 there proceeds an elastically deformable (bendable) tongue element 225, which extends at least partially beyond the trough-like depression 221.

A card to be read must be pushed in between the tongue element 225 and the base of the trough-like depression 221 if it is to be inserted properly (as intended) into the card carrier part 2.

For inserting the card between the tongue element 225 and the base of the trough-like depression 221, the tongue element 225 can be bent elastically upward, and, in the state in which the card has been inserted as intended into the trough-like depression 221, the tongue element 225 presses the card against the base of the trough-like depression. 221.

With particular reference to FIG. 2C, the card receiving portion 22 has raised marginal portions 226 on its sides facing the raised marginal portions 112 of the contact carrier part 1 when the card carrier part 2 is pushed into the contact carrier part 1.

The marginal portions 226 are shaped outward in such a way that, when the card carrier part 2 is pushed into the contact carrier part 1, they run in the groove-like clearances 113 of the contact carrier part 1 and are guided therein.

The inwardly facing regions of the marginal portions are, as can be seen in particular from FIGS. 2B and 2C, provided with elevations 227 and 228, which are positioned and shaped in such a way that, when the card carrier part 2 is pushed into the contact carrier part 1, they run over the elevations 132 and 133 of the plate 13 of the contact carrier part 1 and, accompanying this action, press the plate 13 together with the dome-like end portions 122 of the contact springs 12 of the contact carrier part 1 out of the pushing-in path. Like the elevations 132 and 133 of the contact carrier part 1, the elevations 227 and 228 of the card carrier part 1 are provided with run-up slopes.

The elevations 132 and 133, on the one hand, and 227 and 228, on the other hand, are matched to one another with regard to the individual dimensions, positioning and spacing in such a way that the plate 13 and the contact springs 12 are pressed away essentially during the entire insertion operation and only during this operation. As soon as the card carrier part 2 reaches its intended end position within the contact carrier part 1, the elevations 132 and 133 of the contact carrier part 1 and the elevations 227 and 228 of the card carrier part 2 must run over one another completely, or at least to such an extent that the plate 13 of the contact carrier part 1 is pressed by the contact springs 12 back in the direction of its initial position.

The position into which the contact springs 12 can move once the pressing away has been ended is their essentially relaxed initial position (if the card carrier part 2 does not contain a card) or their contact position, in which they establish contact with the contact regions of a card contained in the card carrier part; the position which the contact springs assume in the state in which they have been pressed away by the card carrier part is a non-contact position unsuitable for establishing contact with the card to be read.

The card carrier part 2, to be more specific its card receiving portion 22, has at its front end, with respect to the pushing-in direction, one or more latching elements in the form of latching depressions 229, which engage with the detents 114 of the contact carrier part 1 in the state in which the card carrier part 2 has been pushed into the contact carrier part 1 and, as a result, prevent unintentional removal of the card carrier part 2 from the contact carrier part 1.

The releasing of this latching connection can be accomplished with the aid of the previously mentioned unlock portion 21 of the card carrier part 2.

The unlocking portion 21 is connected by two elastically deformable (bendable) connecting elements 211 and 212 to the card receiving portion 22. Apart from the connecting elements 211 and 212, the unlocking portion 21 also has two adjacent rocker levers 213 and 214 and a rocker lever actuating portion provided between them. The connecting elements 211 and 212 are connected to the mutually averted arms of the rocker levers 213 and 214.

The rocker levers 213 and 214 have supporting elements 215 and 216, respectively, which strike against the contact carrier part in the state in which the card carrier part 2 has been pushed into the contact carrier part 1.

The rocker lever actuating portion comprises a pressure-applying portion 217 and two elastically deformable (bendable) connecting elements 218 and 219; the connecting elements 218 and 219 connect the pressure-applying portion 217 to the mutually facing arms of the rocker levers 213 and 214, respectively.

The mechanism is actuated by a pressure being exerted on the pressure-applying portion 217 (accessible from the outside). This can be accomplished, for example, by pressing the tip of a ballpoint pen or the like into a depression provided in the pressure-applying portion 217.

When exerting a pressure force on the pressure-applying portion 217, the latter is displaced in a direction of the pressure force vector. The elastically bendable connecting elements 218 and 219 follow the movement of the pressure-applying portion 217 and thereby pull on the arms of the rocker levers 213 and 214, to which they are connected. The pulling on the mutually facing arms of the rocker levers has the effect that the latter pivot in opposite directions about the supporting elements 215 and 216 striking against the contact carrier part 1. This in turn has the consequence that a traction force acts on the connecting elements 211 and 212 which connect the mutually averted arms of the rocker levers 213 and 214 to the card receiving portion 22. This traction acting on the connecting elements 211 and 212 has the consequence that they pull on the card receiving portion 22 of the card carrier part 2. The pulling on the card receiving portion 22 causes the originally mutually engaged latching elements 114 and 229 to disengage, and the elevations 227 and 228 of the card carrier part 2 to pass more or less simultaneously over the elevations 132 and 133 of the plate 13 of the contact carrier part 1. As a result, the card carrier part 2 (its card receiving portion 22) is thereby pulled part of the way out of the contact carrier part 1, while pressing the plate 13 away.

If the pressure exerted on the pressure-applying portion 217 is removed, the elastically deformed unlocking portion 21 relaxes, and the entire card carrier part 2 is then so far out of the unit containing the card reading device described that it can be pulled completely out from the contact carrier part 1 manually by gripping the protruding part, i.e. by gripping the unlocking portion 21.

Figure 3B:
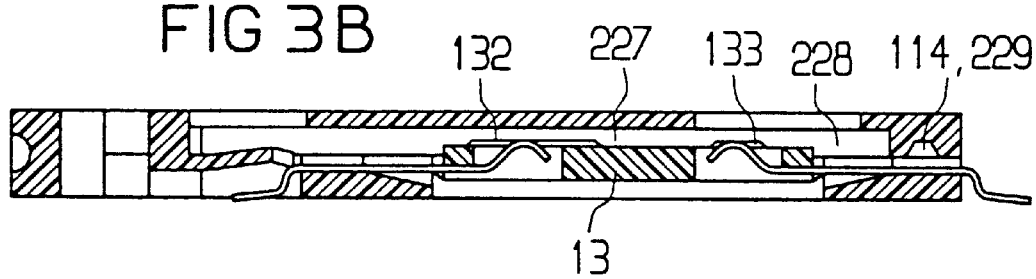
FIG. 3B is a similar view illustrating the situation in which the (cardless) card carrier part of FIG. 2 has reached its end position in the contact carrier part of FIG. 1.
Figure 3C:
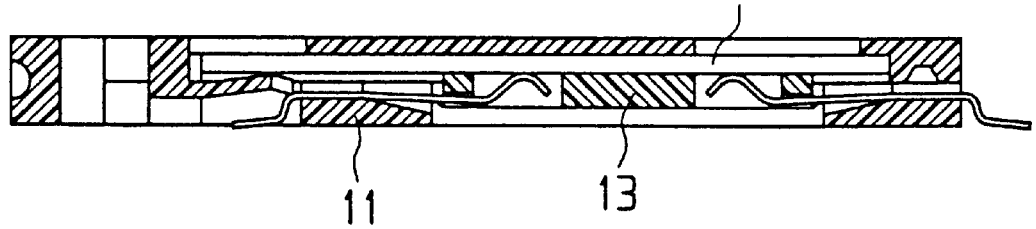
FIG. 3C is a similar view illustrating the situation in which the card carrier part of FIG. 2, fitted with a card, has reached its end position in the contact carrier part.

To illustrate in particular the function and mode of operation of the previously already mentioned elevations 132, 133, 227 and 228, finally the introduction of the card carrier part 2 into the contact carrier part 1 is explained in detail, with reference to FIGS. 3A, 3B and 3C.

Represented in FIG. 3A is the state in which the card carrier part 2 has been partially inserted into the contact carrier part 1. At this stage, the elevations 227 and 228 of the card carrier part 2 have already run onto the elevations 132 and 133 of the contact carrier part 1 and are pressing the latter away from them together with the plate 13 and the contact springs 12. The contact springs 12, to be more specific their dome-like end portions 122 for contacting the card to be read, are located in a non-contact position unsuitable for establishing contact with the card to be read. This can be seen in particular in a comparison of this position with the positions of the contact springs 12 in FIGS. 3B (more or less relaxed initial position) and 3C (contact position).

In the non-contact position of the contact springs 12, shown in FIG. 3A, their dome-like end portions 122 are relatively far away from the contact position of the same, shown in FIG. 3C, and, as a result, cannot come into contact with the surface of a card present in the card carrier part 2. The introduction of a card to be read into the card reading device can therefore be performed without rubbing of the contact springs 12, to be more specific their dome-like end portions 122, on the surface of the card. The dome-like end portions 122 are therefore not subjected to any wearing, damaging or destroying influences during the introduction of the card. In particular, they cannot be adversely affected by scratching or abrasion.

When the insertion of the (cardless) card carrier part 2 has progressed to an advanced stage, it reaches the engaged end position within the contact carrier part 1, shown in FIG. 3B. In this end position, the elevations 132, 133, 227 and 228 are no longer arranged one above the other but next to one another (between one another); the elevations 132 and 133 of the contact carrier part 1 are in this case located in free spaces alongside the elevations 227 and 228 and/or between the elevations 227 and 228 of the card carrier part, and the elevations 227 and 228 of the card carrier part 2 are located in free spaces alongside the elevations 132 and 133 and/or between the elevations 132 and 133 of the contact carrier part 1. In the state in which the respective elevations 132, 133, 227 and 228 are no longer lying one above the other, the plate 13 and the contact springs 12 are no longer pressed into the non-contact position shown in FIG. 3A. Rather, they are freely movable and are no longer hindered, in particular by the card carrier part 2, from assuming a position other than the pressed-down position shown in FIG. 3A. The position of the contact springs 12 shown in FIG. 3B is their initial position, in which they (the contact springs) are more or less relaxed and, in principle, able to come into contact with a card inserted into the card carrier part 2.

The state in which the contact springs are in contact with a card to be read is illustrated in FIG. 3C.

FIG. 3C shows a card carrier part 2, containing a card 3 to be read, in a state in which said part is in the engaged end position within the contact carrier part 1. In the end position of the card carrier part 2, the card 3 received by the latter at the same time assumes its reading position, in which contact can be established with it, to be more specific its contact regions, in the intended way by the contact springs 12. In the state shown in FIG. 3C, contact is also just established with the contact regions of the card 3 by the contact springs 12. The contact springs 12 are in their contact position, which is located between the non-contact position, shown in FIG. 3A, and the initial position, shown in FIG. 3B.

For removing the card 3 from the position shown in FIG. 3C, in the example considered it is necessary to actuate the unlocking mechanism contained in the unlocking portion 21 of the card carrier part 2. The actuation of the unlocking mechanism causes the contact carrier part 1 and the card carrier part 2 to be disengaged from each other, so that the card carrier part 2 can be pulled out from the contact carrier part. During pulling out, the elevations 227 and 228 of the card carrier part 2 in turn run over the elevations 132 and 133 of the contact carrier part 1 and thereby press the contact springs 12 away through the plate 13 out of the contact position toward the non-contact position remote from it. As a result, the card carrier part 2, containing the card 3, can be pulled out from the contact carrier part 1 without the contact springs sliding along the surface of the card.

Not only the introduction of the card to be read into its reading position, but also the removal of the card from the reading position can therefore be accomplished with as little undue stress on the contact springs 12 as possible.

Of the elevations 132, 133, 227 and 228, the elevations 132 and 133 on the one hand, and the elevations 227 and 228 on the other hand are designed to be of different lengths (in the direction of movement during the pushing into one another and pulling out of one another); to be more specific, the elevations 132 are longer than the elevations 133, and the elevations 227 are shorter than the elevations 228. Expressed another way, in each case those elevations which meet one another first during the pushing into each other of the contact carrier part 1 and card carrier part 2 are the longest elevations, and the elevations following (alongside) the respectively longest elevations are increasingly shorter. A precisely converse situation applies in the case of the free spaces, the sizes (lengths) of which are incidentally adapted in each case to the sizes (lengths) of the elevations which are intended to come to lie in them. Free spaces which are too small (too short) to receive an elevation in them are slid over by the elevation concerned, with essentially no influence on the latter.

If the arrangement and distribution of the elevations and free spaces are set up as in the example considered, in such a way that the free spaces passed by the respective elevations are in each case too small to receive the elevation running by them, except in the end position of the card carrier part 2 within the contact carrier part 1, it is possible to achieve the result that the plate 13 can be pressed away uniformly, i.e. without canting, with the respective elevations making contact in each case over a large area and with wide local distribution.

It is consequently ensured that the plate 13 can always perform its intended function in the intended way, namely the pressing away of the contact springs 12 during the introduction of the card into the reading position and during the removal of the same from the card reading device.

There has consequently been provided a card reading device by which the reading of cards can be reliably carried out without errors on a permanent basis, i.e. to the greatest extent irrespective of how long the card to be read and the card reading device have been in use.

I claim:

1. A card reading device for contacting and reading a card with contact regions formed thereon, comprising:

contact elements for establishing contact with contact regions formed on a card to be read in the card reading device, said contact elements being movable into a contact position in which said contact elements establish contact with the contact regions on the card, and into a non-contact position remote from said contact position which is unsuitable for establishing contact with the contact regions on the card;

a moveable plate covering portions of said contact elements, said moveable plate engaging said contact elements for selectively causing said contact elements to move into said contact position during the insertion of the card into the card reading device and into said non-contact position during the removing of the card from the card reading device.

2. The card reading device according to claim 1, wherein said contact elements include the portions covered by said movable plate and other portions for contacting the contact regions on the card to be read, and wherein said plate has openings formed therein through which the other portions of said contact elements protrude.

3. The card reading device according to claim 1, wherein said plate is formed with elevations, said elevations being disposed so as to effect a shifting force on said plate when the card is being introduced into or removed from the card reading device, causing said plate to change its position.

4. The card reading device according to claim 3, wherein the card is moved along a given path on insertion thereof into and removal thereof from the card reading device, and wherein said elevations protrude into said given path.

5. The card reading device according to claim 3, wherein said elevations on said plate are arranged such that elevations formed on the card to be read run up onto said elevations on said plate upon an insertion thereof into the card reading device, pushing the elevations on the card away while sliding over the elevations on said plate and maintaining said plate pushed away from the card.

6. The card reading device according to claim 3, including a card carrier part for receiving the card to be read, said carrier part being formed with carrier part elevations which run up onto said elevations on said plate upon an insertion thereof into the card reading device, thereby pushing said carrier part elevations away while sliding over the elevations on said plate and maintaining said plate pushed away from said card carrier part.

7. The card reading device according to claim 3, wherein said elevations are arranged in two mutually opposite rows of elevations, each of the rows comprising a plurality of elevations one behind the other and being of respectively different lengths.

8. The card reading device according to claim 3, wherein said plate is formed with free spaces of different lengths adjacent said elevations, said free spaces receiving elevations formed on the card to be read.

9. The card reading device according to claim 3, including a card carrier part for receiving the card to be read, said card carrier part being formed with carrier part elevations, said plate being formed with free spaces of mutually different lengths adjacent said elevations on said plate, said free spaces receiving said carrier part elevations.

10. The card reading device according to claim 1, wherein said plate and said contact elements are disposed such that said contact elements are taken along by said plate when said plate is being shifted.

* * * * *